(12) United States Patent
Khorsheed et al.

(10) Patent No.: US 8,111,911 B2
(45) Date of Patent: Feb. 7, 2012

(54) SYSTEM AND METHODS FOR ARABIC TEXT RECOGNITION BASED ON EFFECTIVE ARABIC TEXT FEATURE EXTRACTION

(75) Inventors: Mohammad S. Khorsheed, Riyadh (SA); Hussein K. Al-Omari, Riyadh (SA); Khalid M. Alfaifi, Riyadh (SA); Khalid M. Alhazmi, Riyadh (SA)

(73) Assignee: King Abdulaziz City for Science and Technology, Riyadh, Saudi Aradia (SA)

( * ) Notice: Subject to any disclaimer, the term of this patent is extended or adjusted under 35 U.S.C. 154(b) by 526 days.

(21) Appl. No.: 12/430,773

(22) Filed: Apr. 27, 2009

(65) Prior Publication Data
US 2010/0272361 A1  Oct. 28, 2010

(51) Int. Cl.
*G06K 9/62* (2006.01)
(52) U.S. Cl. .......................... 382/161; 382/186; 382/190
(58) Field of Classification Search ........................ None
See application file for complete search history.

(56) References Cited

U.S. PATENT DOCUMENTS

| | | | | |
|---|---|---|---|---|
| 5,335,289 | A | * | 8/1994 | Abdelazim .................... 382/177 |
| 5,933,525 | A | * | 8/1999 | Makhoul et al. .............. 382/186 |
| 2006/0129380 | A1 | | 6/2006 | El-Shishiny |
| 2010/0246963 | A1 | * | 9/2010 | Al-Muhtaseb et al. ....... 382/185 |

OTHER PUBLICATIONS

Saad Ali Hussien Al-Qahtani, Recognizing Cursive Arabic Script using Hidden Markov Models, Master's Thesis for King Saud University, College of Computer and Information Sciences, Department of Computer Engineering, Jun. 2004, title sheet through p. 107.*
M. S. Khorsheed, Offline recognition of omnifont Arabic text using the HMM Toolkit (HTK), Elsevier Pattern Recognition Letters, Mar. 31, 2007, pp. 1563-1571.*

* cited by examiner

*Primary Examiner* — Brian Werner
(74) *Attorney, Agent, or Firm* — SV Patent Service (57) ABSTRACT

A method for automatically recognizing Arabic text includes digitizing a line of Arabic characters to form a two-dimensional array of pixels each associated with a pixel value, wherein the pixel value is expressed in a binary number, dividing the line of the Arabic characters into a plurality of line images, defining a plurality of cells in one of the plurality of line images, wherein each of the plurality of cells comprises a group of adjacent pixels, serializing pixel values of pixels in each of the plurality of cells in one of the plurality of line images to form a binary cell number, forming a text feature vector according to binary cell numbers obtained from the plurality of cells in one of the plurality of line images, and feeding the text feature vector into a Hidden Markov Model to recognize the line of Arabic characters.

14 Claims, 11 Drawing Sheets

SYSTEM AND METHODS FOR ARABIC TEXT RECOGNITION BASED ON EFFECTIVE ARABIC TEXT FEATURE EXTRACTION

BACKGROUND

The present application relates generally to automatic recognition of Arabic text.

Text recognition, namely, automatic reading of a text, is a branch of pattern recognition. The objective of text recognition is to read printed text with human accuracy and at a higher speed. Most text recognition methods assume that text can be isolated into individual characters. Such techniques, although successful with Latin typewritten or typeset text, cannot be applied reliably to cursive script such as Arabic. Previous research on Arabic script recognition has confirmed the difficulties in attempting to segment Arabic words into individual characters.

Arabic language provides several challenges for text recognition algorithms. Arabic scripts are inherently cursive and it is unacceptable to write isolated characters in block letters. Moreover, the shape of an Arabic letter can be context sensitive; that is it can depend on the location of the letter within a word. For example a letter as 'ه' has four different shapes: isolated as in عبده, beginning as in هند, middle as in نهر, and end as in منه. Furthermore, not all Arabic characters are connected within a word. It can be difficult to automatically determine boundaries between words because spacing may also separate certain characters within a word.

Different classification systems such as statistical models have been applied to text recognition of Arabic text. However, properly extracting text features still remains as a major hurdle to achieve accurate Arabic text recognition.

SUMMARY

In a general aspect, the present invention relates to a method for automatically recognizing Arabic text. The method includes acquiring a text image containing a line of Arabic characters; digitizing the line of the Arabic characters to form a two-dimensional array of pixels each associated with a pixel value, wherein the pixel value is expressed in a binary number; dividing the line of the Arabic characters into a plurality of line images; defining a plurality of cells in one of the plurality of line images, wherein each of the plurality of cells comprises a group of adjacent pixels; serializing pixel values of pixels in each of the plurality of cells in one of the plurality of line images to form a binary cell number; forming a text feature vector according to binary cell numbers obtained from the plurality of cells in one of the plurality of line images; and feeding the text feature vector into a Hidden Markov Model to recognize the line of Arabic characters.

In another general aspect, the present invention relates to a method for automatically recognizing Arabic text. The method includes acquiring a text image containing a line of Arabic characters; digitizing the line of the Arabic characters to form a two-dimensional array of pixels each associated with a pixel value expressed in a binary number, wherein the two-dimensional array of pixels comprises a plurality of rows in a first direction and a plurality of columns in a second direction; counting frequencies of consecutive pixels of a same pixel value in a column of pixels; forming a text feature vector using the frequency counts obtained from the column of pixels; and feeding the text feature vector into a Hidden Markov Model to recognize the line of Arabic characters.

In another general aspect, the present invention relates to a method for automatically recognizing Arabic text. The method includes acquiring a text image containing a line of Arabic characters; digitizing the line of the Arabic characters to form a two-dimensional array of pixels each associated with a pixel value; dividing the line of the Arabic characters into a plurality of line images; downsizing at least one of the plurality of line images to produce a downsized line image; serializing pixel values of pixels in each column of the downsized line image to form a string of serialized numbers, wherein the string of serialized numbers forms a text feature vector; and feeding the text feature vector into a Hidden Markov Model to recognize the line of Arabic characters.

In another general aspect, the present invention relates to a computer program product comprising a computer useable medium having computer readable program code functions embedded in said medium for causing a computer to acquire a text image containing a line of Arabic characters; digitize the line of the Arabic characters to form a two-dimensional array of pixels each associated with a pixel value, wherein the pixel value is expressed in a binary number; divide the line of the Arabic characters into a plurality of line images; define a plurality of cells in one of the plurality of line images, wherein each of the plurality of cells comprises a group of adjacent pixels; serialize pixel values of pixels in each of the plurality of cells in one of the plurality of line images to form a binary cell number; form a text feature vector according to binary cell numbers obtained from the plurality of cells in one of the plurality of line images; and feed the text feature vector into a Hidden Markov Model to recognize the line of Arabic characters.

Implementations of the system may include one or more of the following. The method can further include converting the binary cell number into a decimal cell number; serializing the decimal cell numbers obtained from the plurality of cells in the one of the plurality of line images to form the string of decimal cell numbers; and forming the text feature vector in accordance to a string of decimal cell numbers obtained from the plurality of cells in the one of the plurality of line images. The two-dimensional array of pixels can include a plurality of rows in a first direction and a plurality of columns in a second direction. The line of Arabic characters can be aligned substantially along the first direction. The plurality of line images can be sequentially aligned along the first direction. At least one of the plurality of line images can have a height defined by M number of rows in the first direction and a width defined by N number of columns in the second direction. M and N are integers. The two-dimensional array of pixels can include N number of rows of pixels. N can be in a range between 2 and about 100. N can be in a range between 3 and about 10. The pixel values in the two-dimensional array of pixels can be expressed in single-bit binary numbers. The pixel values in the two-dimensional array of pixels can be expressed in multi-bit binary numbers. The Hidden Markov Model can be implemented as a Hidden Markov Model tool kit.

The systems and methods described in the present application provide comprehensive, quantitative, and accurate techniques for extracting features in Arabic text. The disclosed Arabic character recognition is also more efficient and takes less computation time then some conventional techniques. The disclosed systems and methods are also simpler and easier to use than some conventional techniques.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Figure 1:
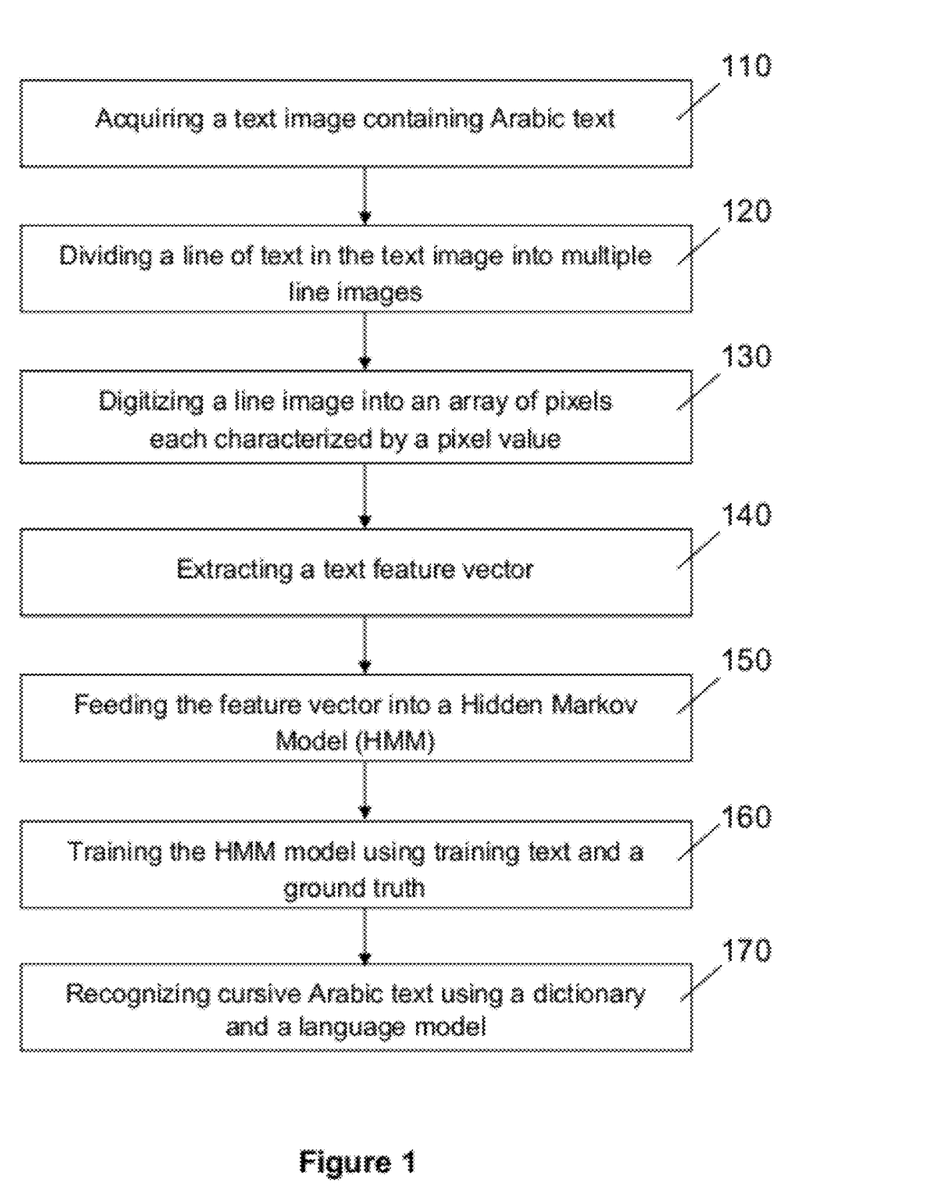
FIG. 1 is a flow diagram illustrating the steps of Arabic text recognition in the present disclosure.

FIG. 1 illustrates a general flow of Arabic text recognition in accordance with the present invention. Referring to FIGS. 1-3C, a text image 200 is acquired from an Arabic text document (step 110, FIG. 1). The Arabic text in the text image 200 may be arranged in multiple text lines 211-214, each including a string of cursive Arabic characters. A text line 211-214 is divided into a plurality of line images 311-313 (step 120, FIG. 1). A line image 311, 312, or 313 is then divided into pixels 321-323 each assigned with a pixel value (step 130, FIG. 1). The width of a line image 311, 312, or 313 can be in a range between 2 pixels to 100 pixels, or in a range between 3 pixels and 10 pixels. A line image 311, 312, or 313 can include a complete character, a partial character, or joint characters.

Figure 2:
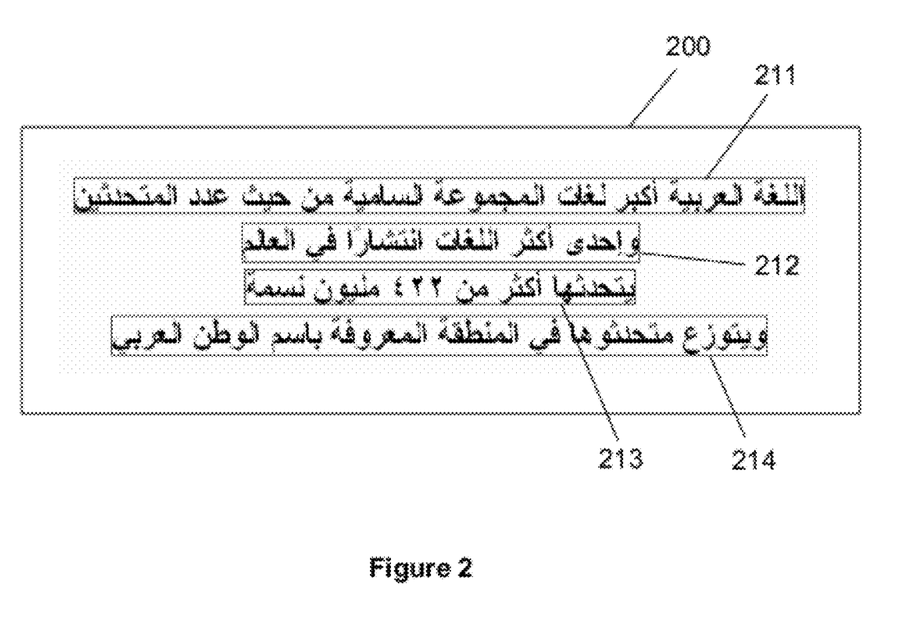
FIG. 2 illustrates a text image containing Arabic text.

A pixel value represents the intensity value of the text image 200 at the location of a particular pixel. In one implementation, a high intensity value can represent a light image color (or low density) at a pixel that may be in the white background. A low intensity value can represent a dark image color (or high density) at a pixel that may be within a stroke of an Arabic character. The pixel values can be represented in different numerical system such as binary, decimal, and hexa-decimal numbers.

Figure 3A:
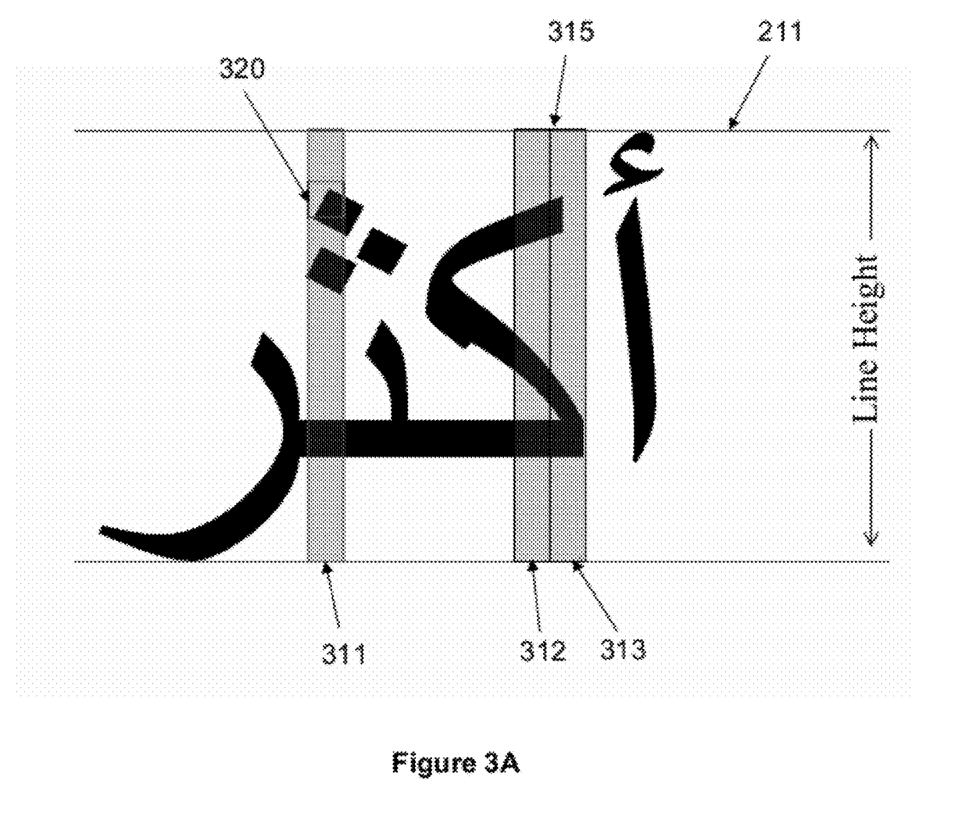
FIG. 3A illustrates the division of the text image into a plurality of line images each containing a plurality of pixels.
Figure 3B:
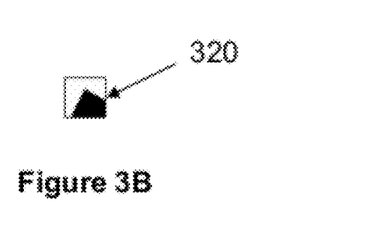
FIGS. 3B and 3C illustrate pixels and pixel values in a portion of the line image shown in FIG. 3A.
Figure 3C:
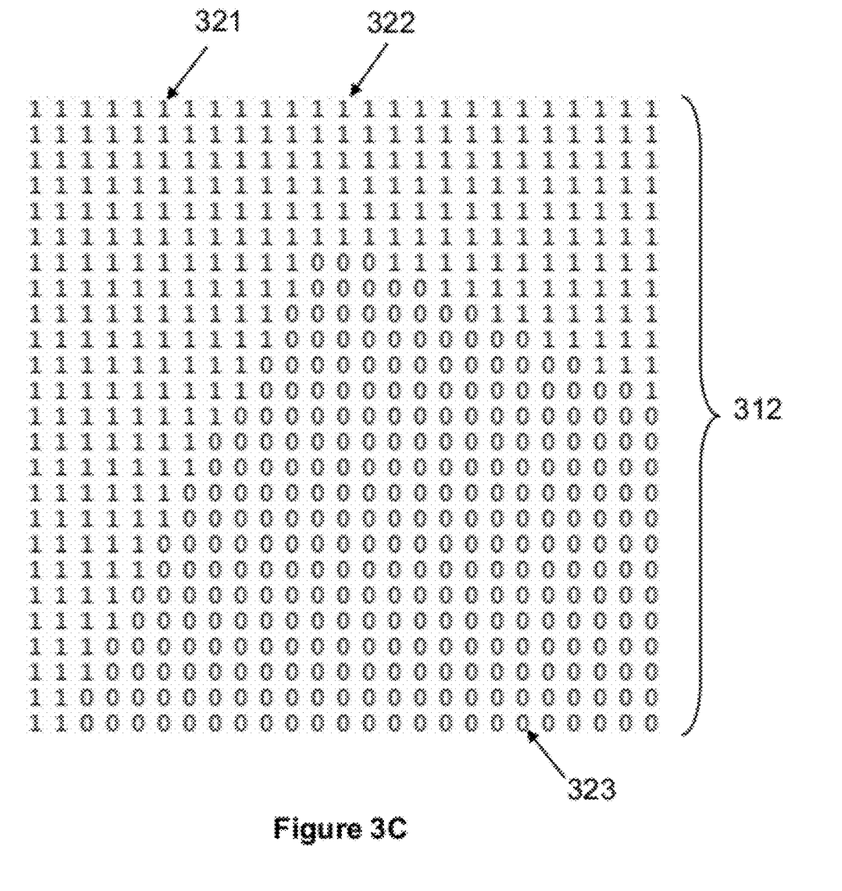

Referring to FIGS. 3A-3C, the line image 311 includes an image portion 320 that includes a plurality of the pixels 321-323, each of which is assigned a binary pixel value "0" or "1". A pixel value "1" represents a white background. A pixel value "0" represents a dark image color (i.e. low intensity) within a stroke of an Arabic character. It should be noted that the disclosed systems and methods are also compatible with multi-bit binary pixel values, which can represent image densities in multi-tone levels (e.g. grayscale).

In accordance to the present disclosure, text feature vectors can be extracted from the text line 211 or the line images 311-313 (step 140, FIG. 1). Details about various implementations of text feature extractions are discussed below in relation to FIGS. 4-8. The exact form of the text feature vectors can vary depending on the extraction methods, as described below.

The feature vectors obtained in step 140 are next fed into a Hidden Markov Model (HMM) (step 150, FIG. 1). In the present disclosure, the HMM can be implemented by a Hidden Markov Model tool kit (HTK), which is a portable toolkit for building and manipulating hidden Markov models. HTK is lexicon free and depends on character models and grammar from training samples. The HMM provides probabilistic interpretations can tolerate variations in the patterns found in feature vectors. Much of the functionality of HTK can be built into the library modules available in C source code. These modules are designed to run with the traditional command line style interface, so it is simple to write scripts to control HTK tools execution.

The HMM can be trained using feature vectors obtained from a text image containing known Arabic words (data transcription) (step 160, FIG. 1). HTK is provided with a character model and a ground truth for training samples. The character modeling component takes the feature vectors and the corresponding ground truth and estimates the character models. The observations produced by the training samples are used to tune the model parameters whereas those produced by the testing samples are used to investigate the system performance. Each state in the model represents a letter in the alphabet set, and each feature vector is equivalent to one observation. HTK training tools can adjust the character model parameters using the prepared training data to predict the known data transcription.

The HMM parameters were estimated from a ground truth for the training image segments. This segmentation may also be applied to the contour to find segmentation points, extract the features from these segments, and then transfer the feature vectors into an observation sequence. The segmentation-based technique used dynamic programming to match word image and strings. The training phase takes scanned lines of text coupled with the ground truth, which is the text equivalent of the text image, as input. Then, each line is divided into narrow vertical windows from which feature vectors are extracted.

The trained HMM is then used to recognize Arabic text in the feature vectors using a dictionary and a language model (step 170, FIG. 1). The recognition phase follows the same step to extract the feature vectors which are used with different knowledge sources estimated in the training phase to find the character sequence with the highest likelihood. The recognition tool requires a network to describe the transition probabilities from one model to another. The dictionary and language model can be input to the tool to help the recognizer to output the correct state sequence.

Figure 4:
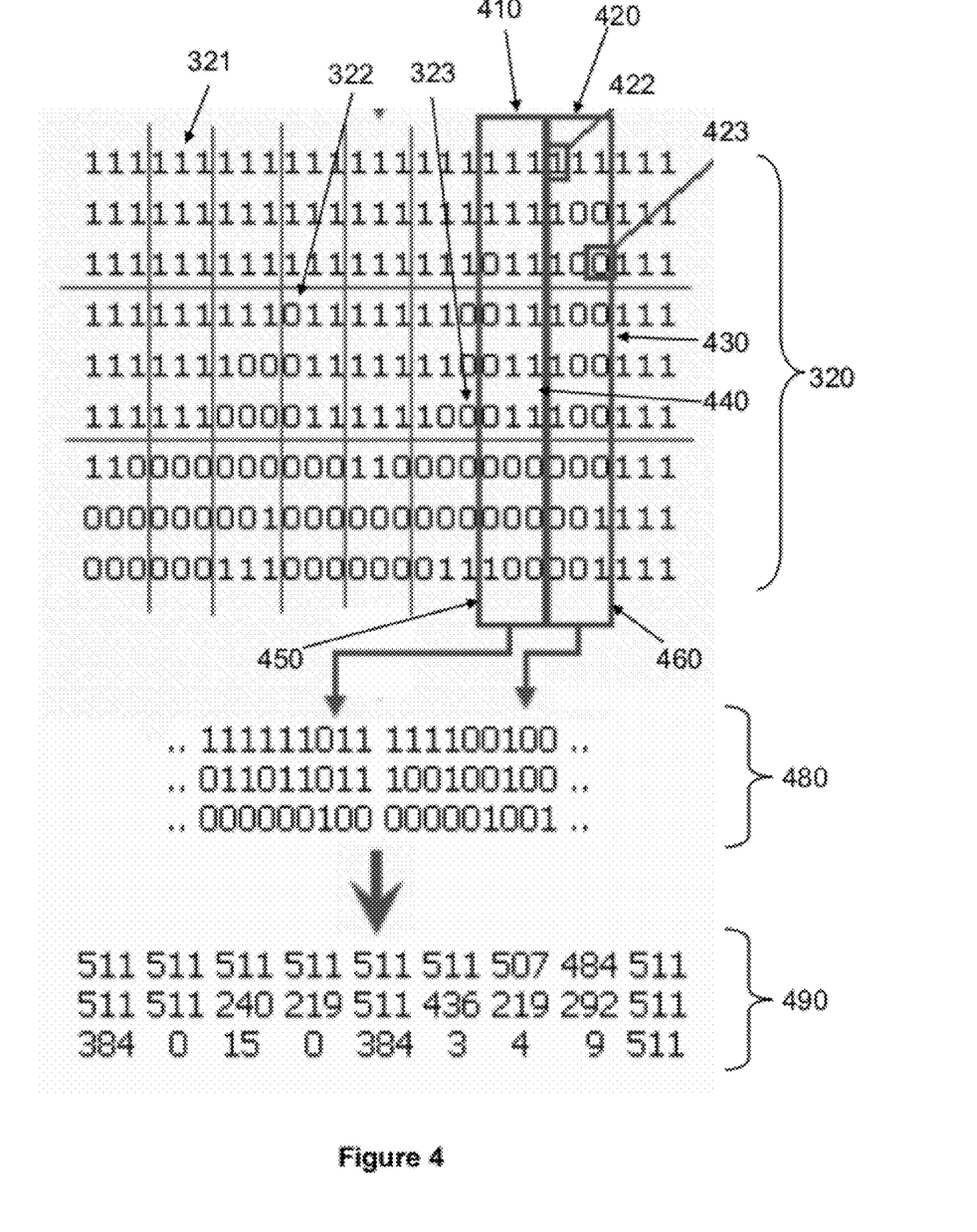
FIG. 4 illustrates a method of text feature extraction in accordance with the present application.
Figure 5:
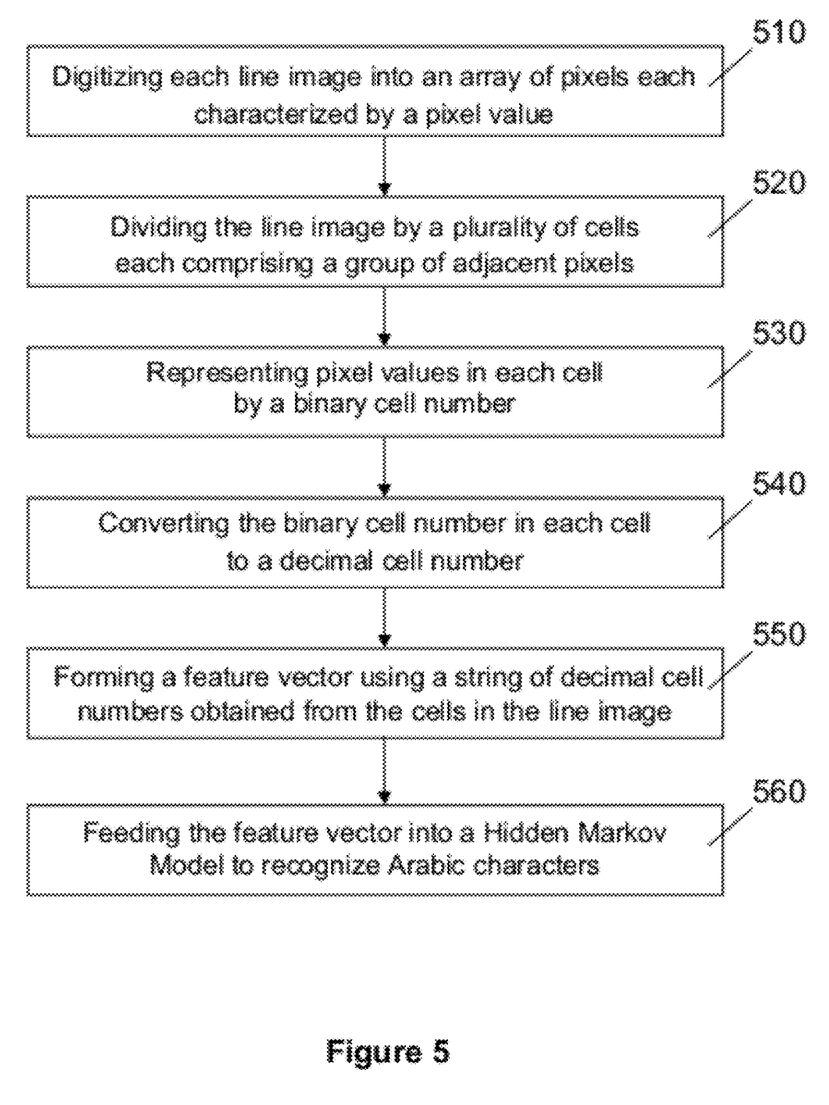
FIG. 5 is a flow diagram illustrating the steps of text feature extraction shown in FIG. 4.

In some embodiments, referring to FIGS. 3A-5, the line image 311-313 is digitized into an array of pixels 321-323 each characterized by a pixel value (step 510, FIG. 5). The line image 311, as shown in FIG. 4, is divided into a plurality of cells 410-460 (step 520, FIG. 5). Each cell 410-460 includes a group of adjacent pixels, such as an array of 3 by 3 pixels. For example, the cell 420 includes pixels 422, 423 and other pixels.

The pixel values in each cell are next represented by a binary cell number (step 530, FIG. 5). The pixel values in each cell are first serialized. For example, the nine pixels 322-323 in the cell 420 are serialized in the order of the three consecutive rows: 1, 1, 1, 1, 0, 0, 1, 0, 0. The series of binary pixel values are then mapped to a 9 bit binary cell number. The pixel value in the pixel 322 is mapped to the most significant bit while the pixel value in the pixel 323 is mapped to the least significant bit. As a result, the pixel values in the cell 420 are represented by a 9-bit binary cell number 111100100. Similarly, pixel values in the cells 410-460 are converted to binary cell numbers 480, each of which being in a range between 0 and 511.

The binary cell numbers in the cells of a line image 311 are next converted to decimal cell numbers 490 (step 540, FIG. 5). The decimal cell numbers 490 are then serialized to from a feature vector for the line image 311 (step 550, FIG. 5). The steps 520-550 are repeated for different line images. The feature vectors from the different line images 311-313 are then fed into a Hidden Markov Model to recognize Arabic characters in the text line (step 560, FIG. 5).

The extraction method described above in conjunction with FIGS. 4-5 represents an implementation of the text feature extract for the process illustrated in FIG. 1. It should be understood that the above described text feature extraction methods are compatible with multi bit pixel values and other numerical representations in the data string. For example, pixel values can be represented by 3-bit or 5-bit binary numbers, which can capture grayscale information (or multi-tone) in the text image. Multi-bit pixel values may improve accuracy of describing text features along the edges of the strokes.

Moreover, instead of a binary number, the pixel value can be represented in any number range between a minimum value and a maximum value. In some implementations, the pixel values can be linearly scaled (or normalized) to a pre-determined range such as [0, 1] or [−1, 1]. The pixel values can then be quantized. Feature vectors can be obtained similar to the steps 530-550.

Figure 6:
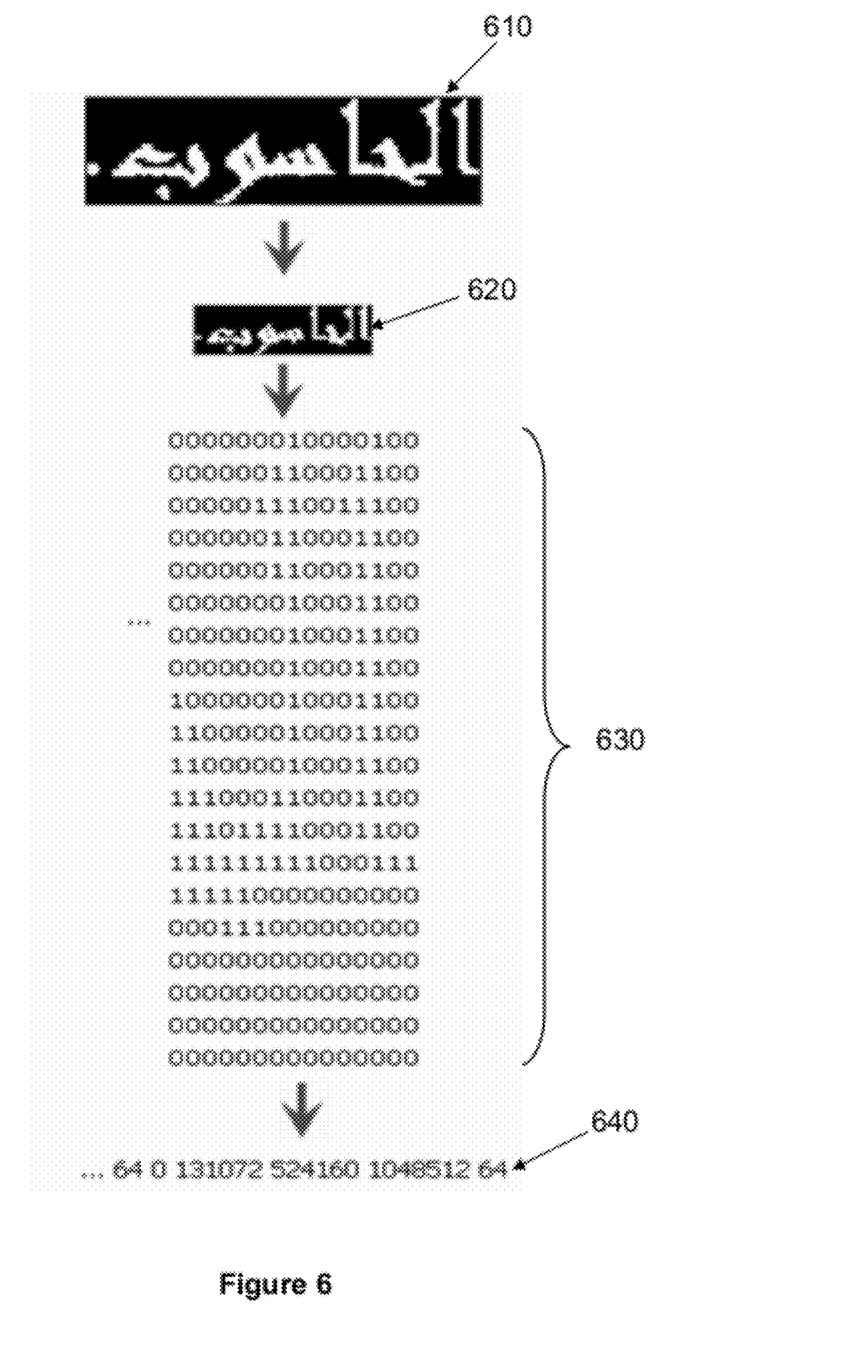
FIG. 6 illustrates another method of text feature extraction in accordance with the present application.

In some embodiments, referring to FIG. 6, a line image 610 is scaled down in resolution (i.e. downsized) to form a downsized line image 620. For example, the line image 610 can have a height of 60 pixels. The downsized line image 620 can have a height of 20 pixels, a factor ⅓ in dimensions. The downsized line image 620 is digitized to form an array 630 of pixels each represented by a pixel value. The pixel values in each column in the array 630 are serialized to form a binary number. The binary numbers from the different columns form a data string 640, which forms a feature vector. Feature vectors obtained from line images of a text line can be fed into a Hidden Markov Model to recognize Arabic characters in the text line (step 560, FIG. 5).

Figure 7A:
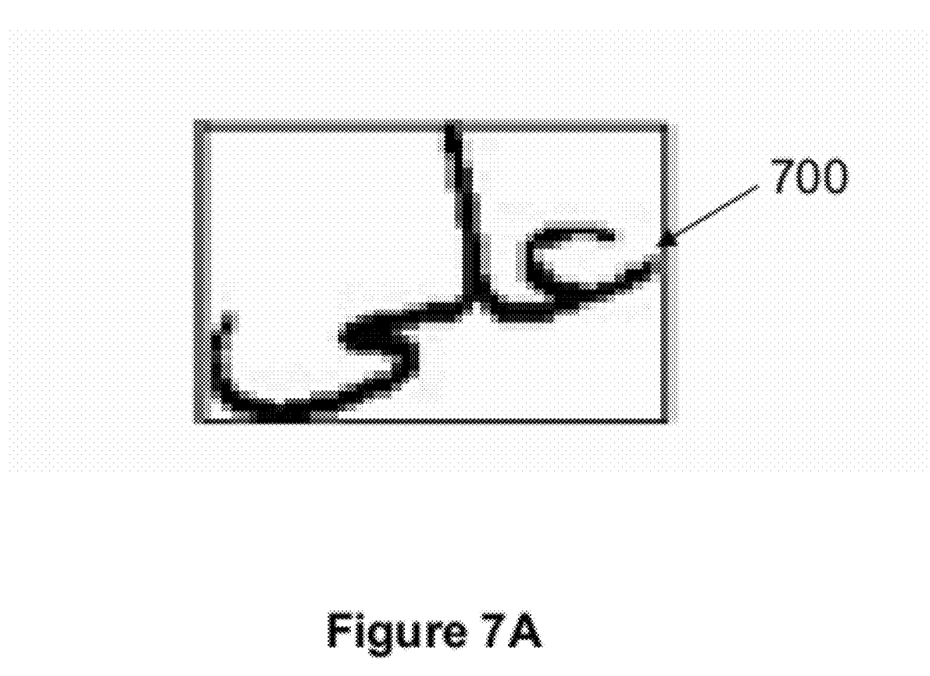
FIGS. 7A-7D illustrates another text feature extraction method in accordance with the present disclosure.
Figure 7B:
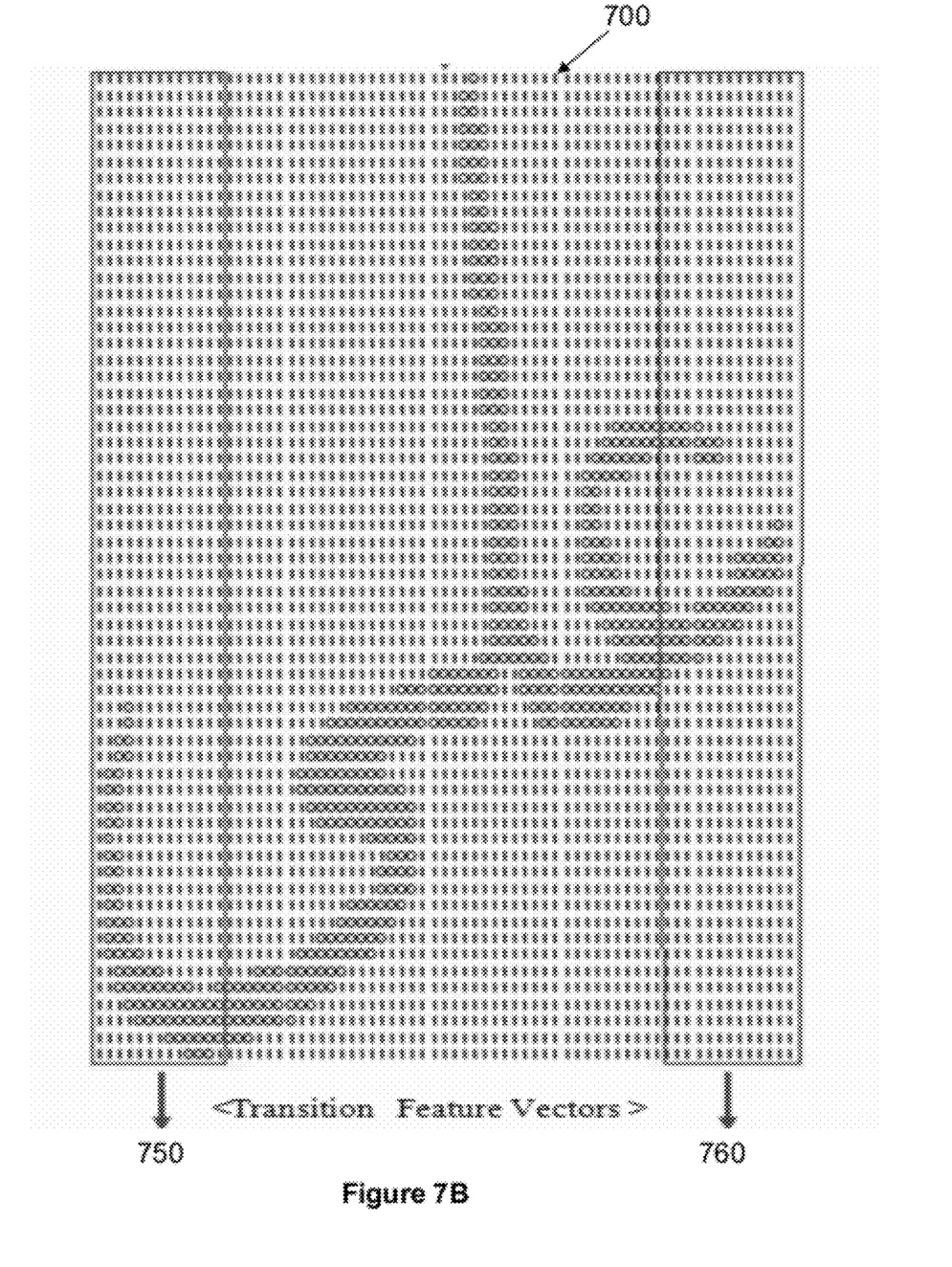
Figure 8:
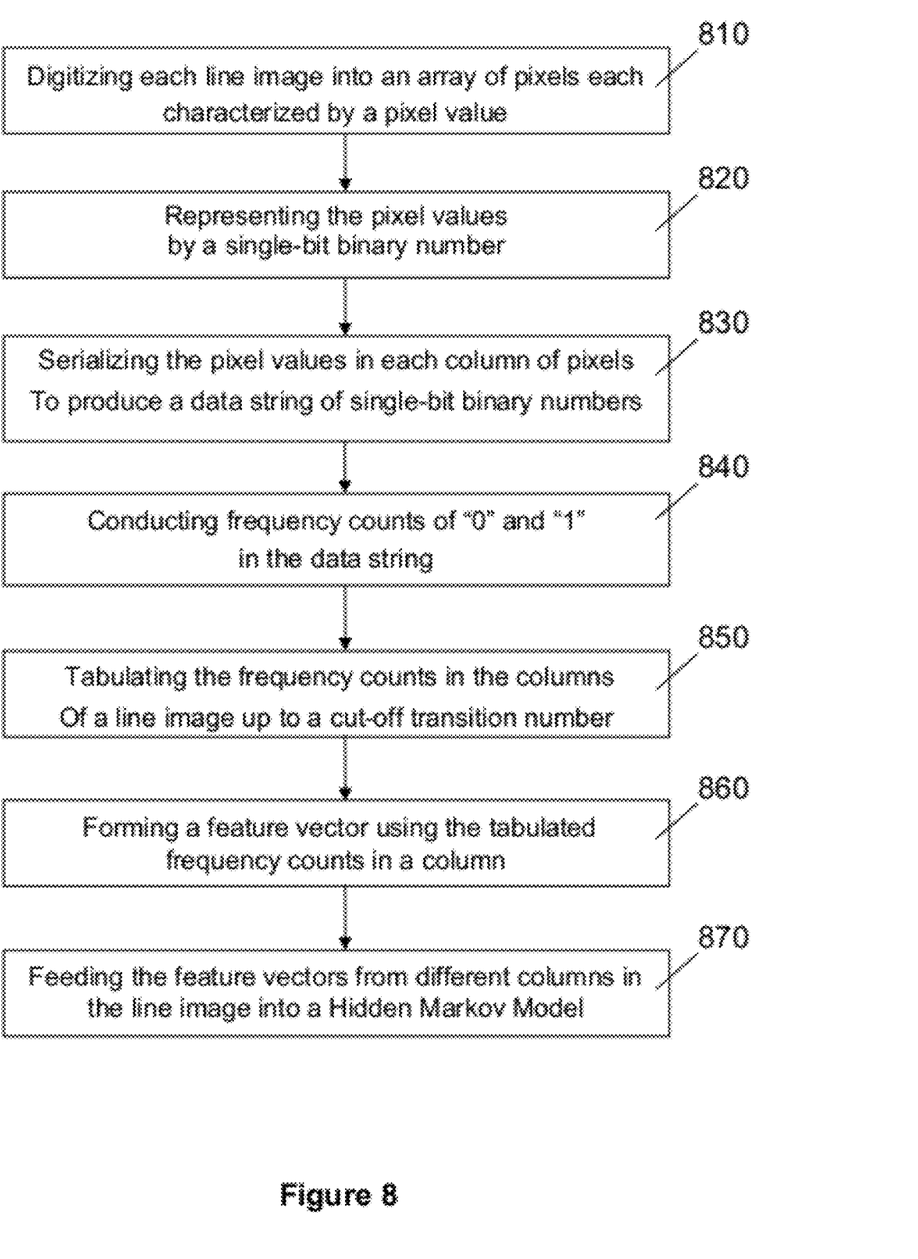
FIG. 8 is a flow diagram illustrating the steps of text feature extraction shown in FIGS. 7A-7D.

Referring to FIGS. 7A, 7B, and 8, a line image 700 is digitized into an array of pixels (step 810, FIG. 8) similar to step 510 (FIG. 5). The pixels are arranged in a plurality of columns. The pixel values are represented by single-bit binary numbers having values of "1" or "0". The pixel values in each column are serialized to form a string of single-bit binary numbers (step 830, FIG. 8).

Figure 7C:
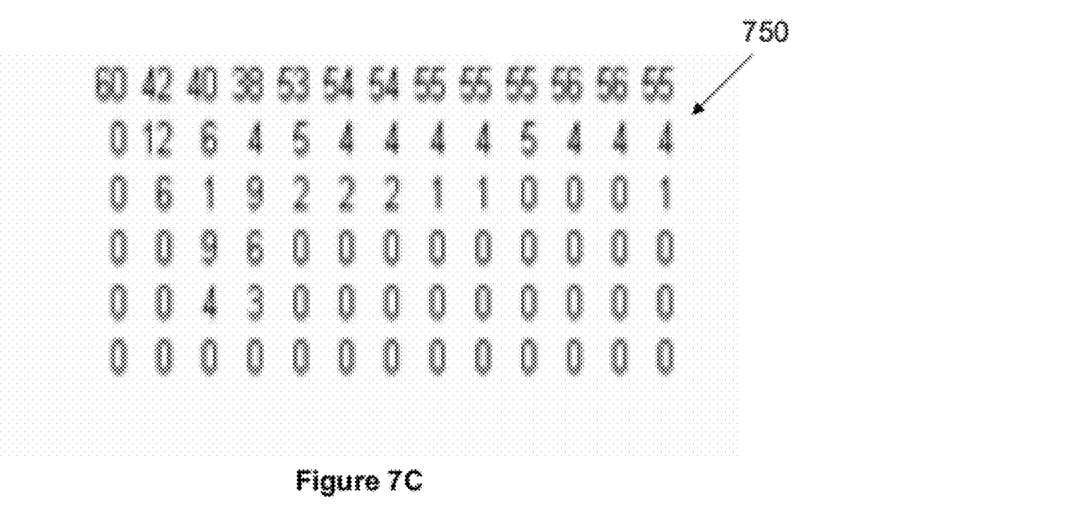
Figure 7D:
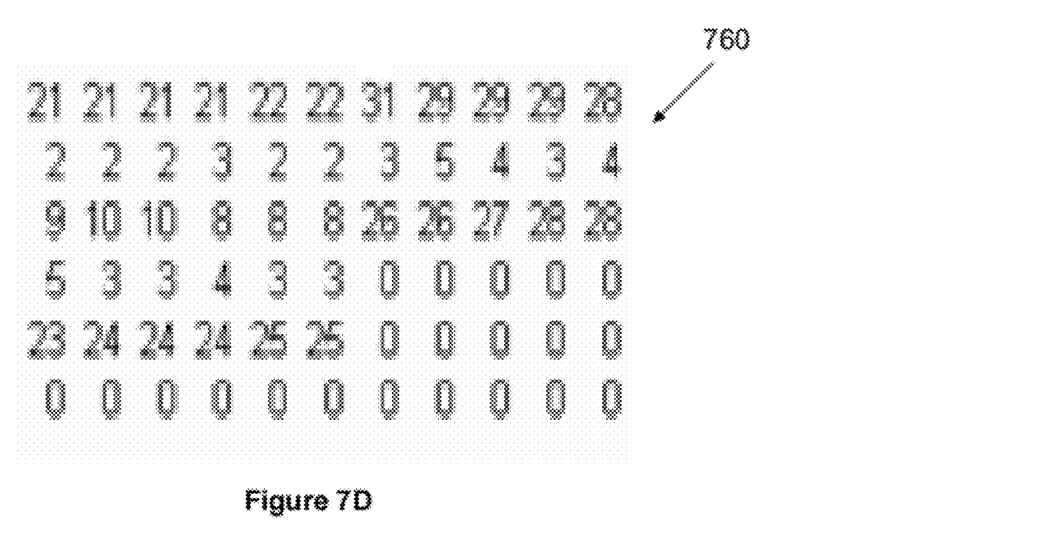

Next, as shown in FIGS. 7C and 7D, frequencies of consecutive pixels having same binary pixel values of "0" and "1" are computed (step 840, FIG. 8). The frequencies are counted up to a cut off transition number. The frequencies are tabulated to form the frequency counts 750 and 760 (step 850, FIG. 8). To distinguish two columns of pixels having the same number of transitions but complimentary pixel values, for example,

| 0 | 1 |
| 0 | 1 |
| 0 | 1 |
| 1 | 0 |
| 1 | 0 |
| 0 | 1 |
| 0 | 1 |
| 1 | 0 | the frequency count is conducted by starting to count the number of "1"s from the top pixel in a column. The column on the left thus first has a "0" count of the pixel value "1" followed by "3" counts of the pixel value "0". The complimentary pixel values in the two columns will result in the following frequency counts:

| 0 | 3 |
| 3 | 2 |
| 2 | 2 |
| 2 | 1 |
| 1 | 0 |
| 0 | 0 |

It should be understood that the initial pixel count at the beginning of each column can also be conducted on a pixel value "0" without deviating from the spirit of the present invention.

Each row in the tabulated frequency counts 750, 760 (in FIGS. 7C, 7D) represents a transition in pixel value, from a white background (having a pixel value of "1") to a dark text area (having a pixel value of "0"), or vice versa. To compress data, the frequency count is cut off at a maximum transition number.

The frequency counts in each column of the tabulated frequency counts 750, 760 form a feature vector (step 860, FIG. 8). Thus a column can also be referred as a vector in the currently described embodiments. The feature vectors from different columns in the line image into a Hidden Markov Model (step 870, FIG. 8).

The maximum transition number is determined by a statistical analysis on a large sample of Arabic text. As shown in Table I, approximately 99.31% of the columns have six or fewer transitions. In other words, a vast majority of text images can be properly characterized by selecting the cut-off transition number at six.

TABLE 1

Transition Count in Corpus

| Transition Number Within a Column | Column Count | Percent |
|---|---|---|
| 0 | 3003663 | 18.44% |
| 1 | 95418 | 0.59% |
| 2 | 7694625 | 47.24% |
| 3 | 74196 | 0.46% |
| 4 | 4231776 | 25.98% |
| 5 | 45013 | 0.28% |
| 6 | 1028765 | 6.32% |
| <=6 | | 99.31% |
| 7 | 7403 | 0.04% |
| 8 | 94771 | 0.57% |
| 9 | 900 | 0.01% |
| 10 | 9543 | 0.05% |
| 12 | 1367 | 0.01% |
| More than 12 transitions | | 0.01% |

When building an HMM based system, the type of the feature vectors to be used in training and testing this system is first defined. Feature vectors can be categorized as continuous type and a discrete type. In the systems using continuous feature vectors, an array or sometimes a matrix of coefficients to feed the models are used. In the discrete systems, a single coefficient is fed into the model. Vector quantization means converting the continuous vectors to discrete vectors, and this can be done using HQuant and HCopy tools which come with HTK. The HQuant is used to build the codebook from the training data to be used later with the HCopy tool to produce the discrete vectors. Codebook building affects the performance of the system depending on its size, and is affected by the amount of data used to build it. HQuant uses the Linear Vector Quantization algorithm to build the codebook and this is computationally an expensive algorithm to compute. In the present disclosure, a new method named the Unique Vector Quantization (UVQ) is introduced to reduce the calculation time and to improve the performance of the system. This method focuses on reducing the number of feature vectors used to build the codebook using the Linear Vector Quantization algorithm by deleting the repetitions of feature vectors and hold just a single copy of each feature vector. As shown in Table 2, the number of feature vectors within the corpus is greatly reduced.

TABLE 2

Unique vectors count within corpus

| Corpus Lines Count | Vectors Count | Unique Vector Count | Reduction Percent |
|---|---|---|---|
| 10,000 lines | 12,285,426 | 413,410 | 96.64% |
| 15,000 lines | 16,288,252 | 591,673 | 96.37% |

When we tried to build a codebook using all the feature vectors of 2000 different line images, we found that the maximum size that can be built for this codebook is 728. The time taken to build this codebook was about 9 hours instead of 1 hour and 30 minutes taken to build a 1024 size codebook from the unique feature vectors only. The recognition rates from these experiments using mono models are shown in Table 3. When unique feature vectors are used with the Linear Vector Quantization algorithm, codebook size is increased. The computation time is reduced by a factor of six, and the recognition rate increased.

TABLE 3

Recognition rates for unique vector count

| Codebook Type | Codebook Size | Building Time | Recognition Rate |
|---|---|---|---|
| Without Using UVQ | 728 | 9 Hours | 83.59% |
| Using UVQ | 1024 | 1 Hour and 30 Minutes | 85.22% |

It should be understood that the above described methods are not limited to the specific examples used. Configurations can vary without deviating from the spirit of the invention. For example, the cut-off transition number can be selected to be other than six. The height and the width of the line image as well as the size of the cells within the line images can also be different from the examples used above. The form of the text feature vectors can vary depending on the extraction methods. For example, a feature vector can be in the form of a string of binary numbers, decimal numbers, or numbers in other numerical systems.

What is claimed is:

1. A method for automatically recognizing Arabic text, comprising:
    acquiring a text image containing a line of Arabic characters;
    digitizing the line of the Arabic characters to form a two-dimensional array of pixels each associated with a pixel value, wherein the pixel value is expressed in a binary number;
    dividing the line of the Arabic characters into a plurality of line images;
    defining a plurality of cells in one of the plurality of line images, wherein each of the plurality of cells comprises a group of adjacent pixels;
    serializing pixel values of pixels in each of the plurality of cells in one of the plurality of line images to form a binary cell number;
    forming a text feature vector according to binary cell numbers obtained from the plurality of cells in one of the plurality of line images; and
    feeding the text feature vector into a Hidden Markov Model to recognize the line of Arabic characters.

2. The method of claim 1, further comprising:
    converting the binary cell number into a decimal cell number;
    serializing the decimal cell numbers obtained from the plurality of cells in the one of the plurality of line images to form the string of decimal cell numbers; and
    forming the text feature vector in accordance to a string of decimal cell numbers obtained from the plurality of cells in the one of the plurality of line images.

3. The method of claim 1, wherein the two-dimensional array of pixels comprises a plurality of rows in a first direction and a plurality of columns in a second direction, wherein the line of Arabic characters is aligned substantially along the first direction, wherein the plurality of line images are sequentially aligned along the first direction.

4. The method of claim 3, wherein the two-dimensional array of pixels comprises N number of rows of pixels, wherein at least one of the plurality of line images has a height defined by M number of rows in the first direction and a width defined by N number of columns in the second direction, wherein M and N are integers.

5. The method of claim 4, wherein N is in a range between 2 and about 100.

6. The method of claim 5, wherein N is in a range between 3 and about 10.

7. The method of claim 1, wherein the pixel values in the two-dimensional array of pixels are expressed in single-bit binary numbers.

8. The method of claim 1, wherein the pixel values in the two-dimensional array of pixels are expressed in multi-bit binary numbers.

9. A method for automatically recognizing Arabic text, comprising:
    acquiring a text image containing a line of Arabic characters;
    digitizing the line of the Arabic characters to form a two-dimensional array of pixels each associated with a pixel value;
    dividing the line of the Arabic characters into a plurality of line images;
    downsizing at least one of the plurality of line images to produce a downsized line image;
    serializing pixel values of pixels in each column of the downsized line image to form a string of serialized numbers, wherein the string of serialized numbers forms a text feature vector; and
    feeding the text feature vector into a Hidden Markov Model to recognize the line of Arabic characters.

10. The method of claim 9, wherein the two-dimensional array of pixels comprises a plurality of rows in a first direction and a plurality of columns in a second direction, wherein the line of Arabic characters is aligned substantially along the first direction, wherein the plurality of line images are sequentially aligned along the first direction.

11. The method of claim 10, wherein the two-dimensional array of pixels comprises N number of rows of pixels, wherein at least one of the plurality of line images has a height defined by M number of rows in the first direction and a width defined by N number of columns in the second direction, wherein M and N are integers.

12. A computer program product comprising a non-transitory computer useable medium having computer readable program code functions embedded in said medium for causing a computer to:

acquire a text image containing a line of Arabic characters;

digitize the line of the Arabic characters to form a two-dimensional array of pixels each associated with a pixel value, wherein the pixel value is expressed in a binary number;

divide the line of the Arabic characters into a plurality of line images, wherein the two-dimensional array of pixels comprises a plurality of rows in a first direction and a plurality of columns in a second direction, wherein the line of Arabic characters is aligned substantially along the first direction, wherein the plurality of line images are sequentially aligned along the first direction and have a width between 2 and 100 columns of pixels;

define a plurality of cells in one of the plurality of line images, wherein each of the plurality of cells comprises a group of adjacent pixels;

serialize pixel values of pixels in each of the plurality of cells in one of the plurality of line images to form a binary cell number;

form a text feature vector according to binary cell numbers obtained from the plurality of cells in one of the plurality of line images; and feed the text feature vector into a Hidden Markov Model to recognize the line of Arabic characters.

13. The computer program product of claim 12, wherein the computer readable program code functions embedded in said medium is configured to cause the computer to:

to convert the binary cell number into a decimal cell number;

to serialize the decimal cell numbers obtained from the plurality of cells in the one of the plurality of line images to form the string of decimal cell numbers; and to form the text feature vector in accordance to a string of decimal cell numbers obtained from the plurality of cells in the one of the plurality of line images.

14. The computer program product of claim 12, wherein the two-dimensional array of pixels comprises N number of rows of pixels, wherein at least one of the plurality of line images has a height defined by M number of rows in the first direction and a width defined by N number of columns in the second direction, wherein M and N are integers.

* * * * *